United States Patent Office 3,178,964
Patented Apr. 20, 1965

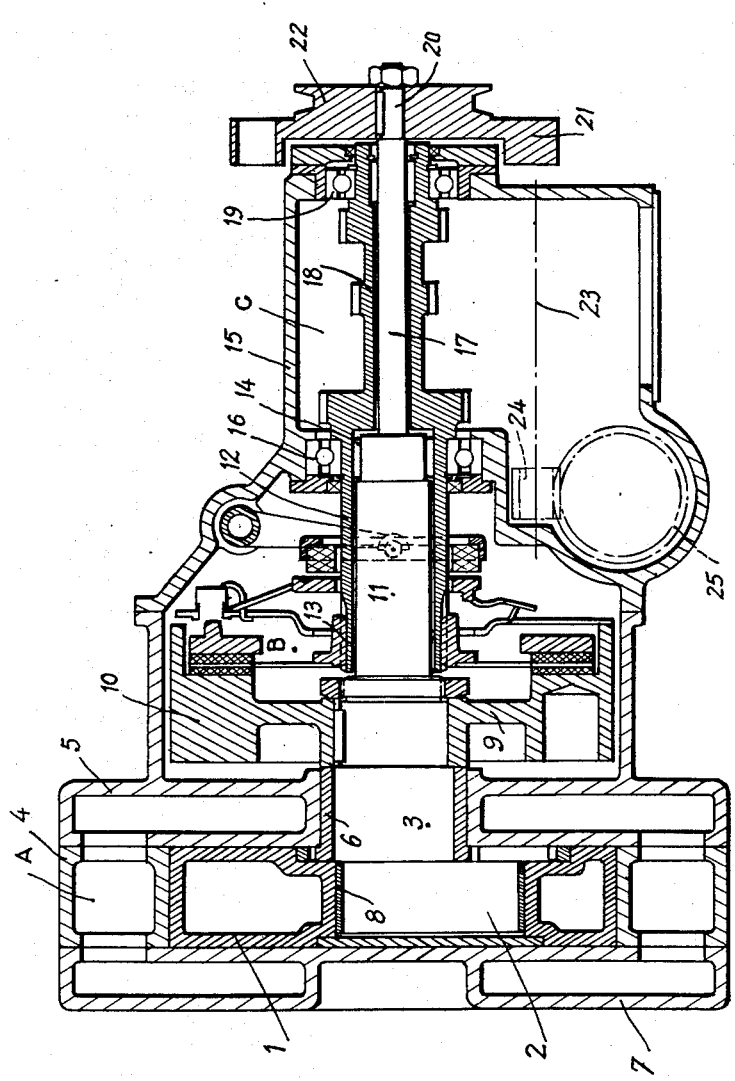

3,178,964
ENGINE PROPULSION UNITS
Lucien Péras, Billancourt, France, assignor to Regie Nationale des Usines Renault, Billancourt, France
Filed June 7, 1961, Ser. No. 115,559
Claims priority, application France, June 21, 1960, 830,700, Patent 1,268,554
1 Claim. (Cl. 74—645)

The present invention is concerned with an engine propulsion unit comprising an engine of the rotary type, a clutch and a gear-box.

One of the improvements relates to an overhung mounting of the engine rotor which has for its object to facilitate assembly and also to permit access to one face of the rotor.

This type of construction necessitates two bearings situated on the same side of the rotor, and a sufficient distance must be provided between these two bearings in order to ensure an accurate centering of the engine shaft and to avoid excessive loads on the said bearings.

A characteristic feature of the invention consists in mounting the clutch on the engine shaft between the above two bearings, so as to reduce the overall longitudinal dimensions of the unit.

A further characteristic feature consists in extending the engine shaft through the gear-box, this latter arrangement being provided to supply a drive for the auxiliaries (such as a water-pump, fan, generator, etc.) at the extremity of the shaft.

Still a further feature of the invention concerns the balancing of the rotor which rotates eccentrically, this balancing being effected by means of two counter-weights mounted in opposition, one being arranged in the engine fly-wheel, the other being placed at the extremity of the engine shaft and outside the gear-box.

The transverse section shown in the single figure of the accompanying drawing shows one example of construction without any implied limitation, in which there can be seen at A the rotary engine, at B the clutch and at C the gear-box.

The rotor 1 is mounted on an eccentric 2 of the engine shaft 3. This eccentric is provided with a ring 8 on which the rotor rotates. The engine casing is formed by a stator 4, a rear end-plate 5 forming at the same time the clutch casing and supporting at its centre a journal bearing 6 forming the first bearing of substantial dimensions, to constitute an appropriate support for the rotor.

A plate 7 is mounted on the front and permits of easy access to the engine parts, without any dismantling of the driving shaft. The engine fly-wheel 9 is keyed on the driving shaft 3 and carries an out-of-balance weight 10 for partially balancing the rotor 1.

The clutch B is mounted in the conventional manner on one of the faces of the fly-wheel 9. The clutch disc 26 is mounted on splines on a hollow shaft 12 rotating freely on the extension 11 of the driving shaft 3 by means of a ring 13 and a roller bearing 14 which constitues the second bearing of the driving shaft 3.

Directly above this latter bearing, inside the casing 15 of the gear-box, is placed a bearing 16 which centers the hollow shaft 12.

It should be observed that the shafts 11 and 12 have no relative movement of rotation when the clutch B is engaged.

A second stepped extension 17 of the driving shaft projects into the interior of the primary shaft 18, which latter shaft may be integral with the clutch shaft 12. A bearing 19 supports the shaft 13 at the rear of the gear-box.

A reduced end-portion 20 of the shaft 17 carries the second out-of-balance weight 21 for balancing the rotor, this balance weight 21 being keyed on the shaft 17 and carrying a pulley 22 for driving the auxiliaries (not shown).

There has been shown diagrammatically by way of indication, the secondary shaft 23 of the gear-box, which may carry at one extremity a drive for the wheel-shafts by a worm 24 and pinion 25 or by a pair of bevel-gears (not shown).

I claim:
An engine propulsion unit comprising an engine stator housing for receiving an engine rotor therein, a first bearing member disposed in said stator housing, an engine drive shaft extending through said bearing member and into said stator housing and journaled therein, an engine rotor secured to one end of said drive shaft for rotation therewith and mounted overhung adjacent said first bearing member, a clutch disposed adjacent said stator housing and said bearing member, a fly wheel adapted to be engaged by said clutch and having a balancing mass, said fly wheel being mounted on said shaft contiguous to said first bearing and on the opposite side thereof with respect to said rotor, a gear box disposed adjacent said clutch, with said clutch being disposed between said stator housing and said gear box, said driving shaft extending out of said stator housing on the side of said fly wheel and through said clutch and gear box, a second bearing member spaced from said first bearing member and adjacent the contiguous portions of said clutch and gear box, and away from said stator housing, said shaft being extended through and journaled in said second bearing member, a hollow tubular shaft extending through said gear box and connected to said clutch for connecting said gear box to said clutch, said driving shaft extending through said hollow shaft, a secondary balancing mass for the engine, said secondary balancing mass being located at the opposite end of said shaft with respect to said first balancing mass, and a spaced pair of bearing members in said gear box supporting said hollow shaft, said clutch being secured to said hollow shaft, and said clutch releasably coupling said gear box to said engine rotor.

References Cited by the Examiner
UNITED STATES PATENTS

| | | | |
|---|---|---|---|
| 1,562,743 | 11/25 | Daw. | |
| 1,864,699 | 6/32 | Varley | 91—56 X |
| 2,013,163 | 9/35 | Meyer. | |
| 2,140,687 | 12/38 | Brown | 74—15.63 |
| 2,235,160 | 3/41 | Ljungstrom | 123—192 |
| 2,945,382 | 7/60 | Ritter et al. | 74—15.63 X |
| 2,953,943 | 9/60 | Arnold | 74—15.63 X |

OTHER REFERENCES

McGraw-Hill Series in Mechanical Engineering, Mechanics of Machinery, 4th edition, Ham Crane and Rogers, McGraw-Hill Book Co., Inc. (1958), pp. 365, 383, 387–390.

DON A. WAITE, *Primary Examiner.*
BROUGHTAN G. DURHAM, *Examiner.*